April 3, 1928.  1,664,810
R. C. FORBELL
DIRECTION SIGNAL
Filed Oct. 21, 1926  3 Sheets-Sheet 1
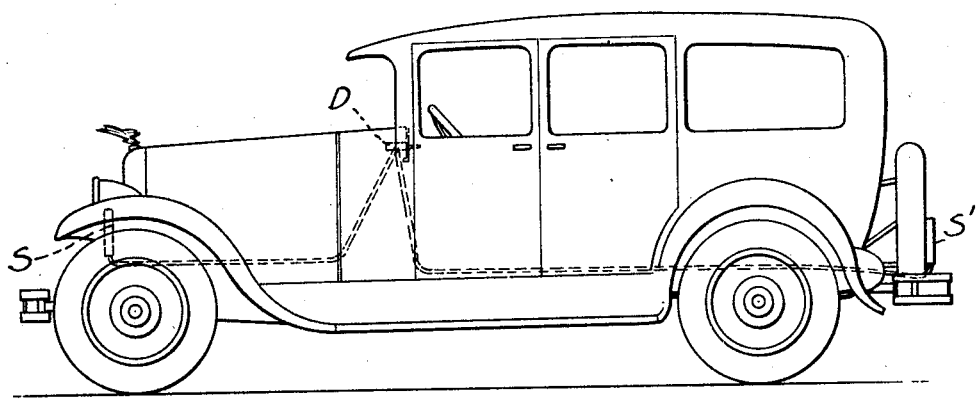
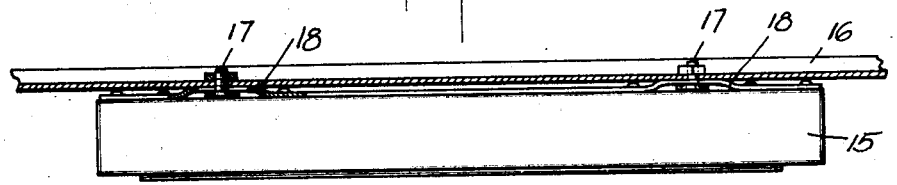
INVENTOR
ROBERT C. FORBELL
BY Munn & Co.
ATTORNEY April 3, 1928.
R. C. FORBELL
1,664,810
DIRECTION SIGNAL
Filed Oct. 21, 1926   3 Sheets-Sheet 2
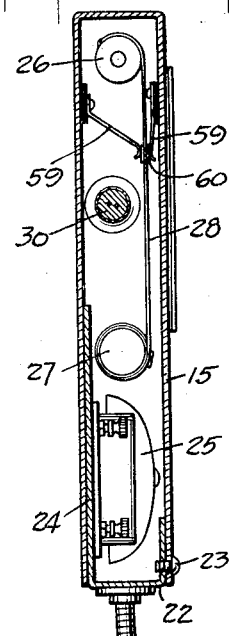
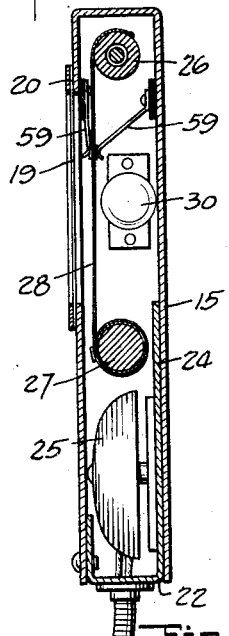
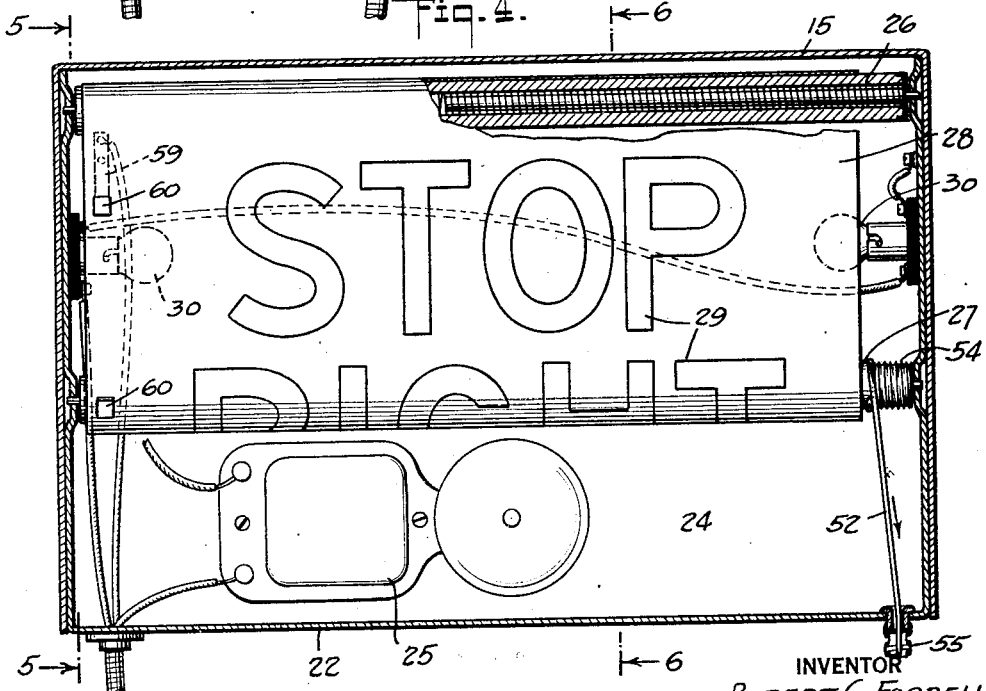
INVENTOR
ROBERT C. FORBELL
BY Munn & Co.
ATTORNEY April 3, 1928.  
R. C. FORBELL  
DIRECTION SIGNAL  
Filed Oct. 21, 1926  
1,664,810  
3 Sheets-Sheet 3

INVENTOR  
ROBERT C. FORBELL  
BY Munn & Co.  
ATTORNEY

Patented Apr. 3, 1928.

1,664,810

UNITED STATES PATENT OFFICE.

ROBERT C. FORBELL, OF LOS ANGELES, CALIFORNIA.

DIRECTION SIGNAL.

Application filed October 21, 1926. Serial No. 143,174.

My invention relates to direction signals for motor vehicles, and a purpose of my invention is the provision of a direction signal which is operable to display any one of a plurality of signals in the form of legends on a web, and in conjunction with which an alarm is automatically sounded with sufficient loudness to direct the attention of approaching motorists or pedestrians so that they will be caused to observe the signal and thus be apprised of the driver's intentions.

It is also a purpose of my invention to provide two direction signals of the above described character which are positioned on a motor vehicle to display signals at opposite ends of the vehicle so that motorists or pedestrians from the front and rear will be apprised of the driver's intentions, my invention including manually operable means common to both of the signals for actuating the latter simultaneously, and in a manner to display the same signal legends at opposite ends of the vehicle.

A further purpose of my invention is the provision of a direction signal so constructed as to render it readily accessible for repairs or the substitution of new parts, and further a signal which is constructed to render it immune to the action of the elements so that its proper operation at all times is insured.

I will describe only one form of direction signal embodying my invention, and will then point out the novel features thereof in claim.

In the accompanying drawings

Figure 1 is a view showing in side elevation a motor vehicle having applied thereto one form of direction signal embodying my invention;

Figure 2 is an enlarged view showing in front elevation one of the signal units embodied in the direction signal shown in Figure 1;

Figure 3 is a view showing in top plan the signal unit shown in Figure 1 and the means for attaching the unit to the vehicle in section;

Figure 4 is a view showing in vertical section the signal unit shown in Figure 2;

Figure 8:
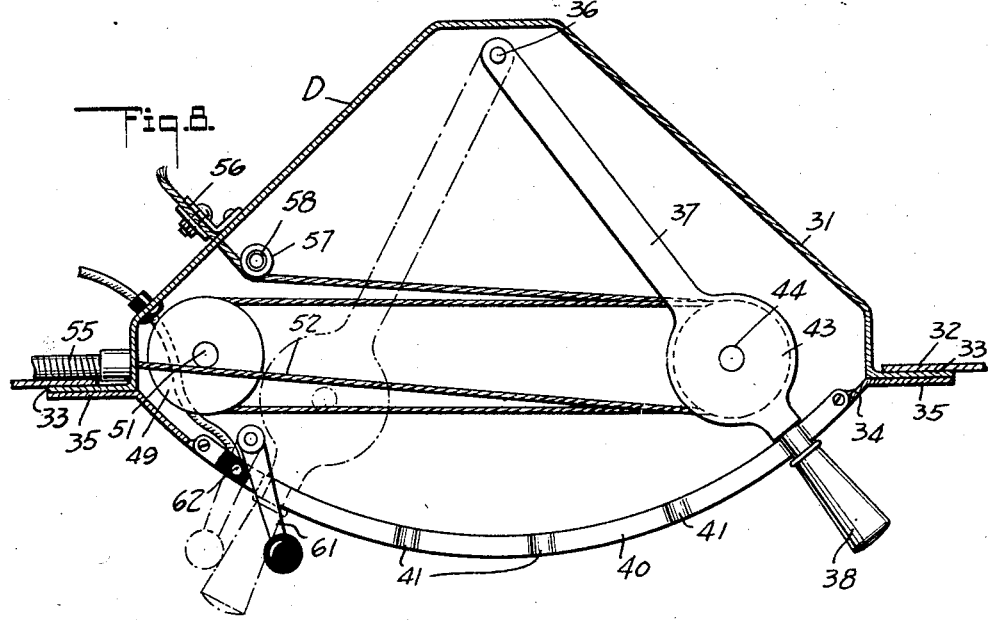
Figure 9:
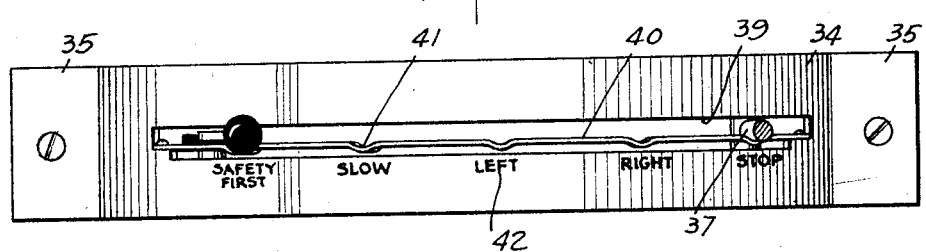
Figure 10:
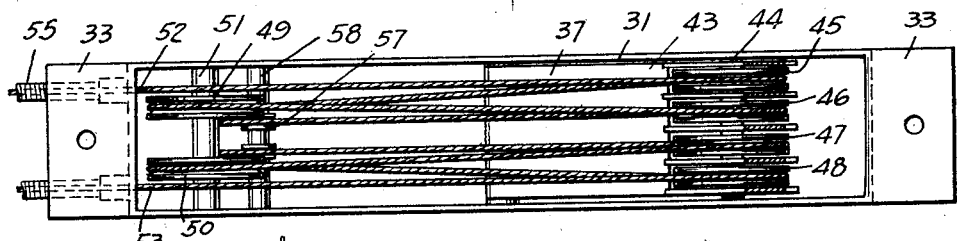
Figure 11:
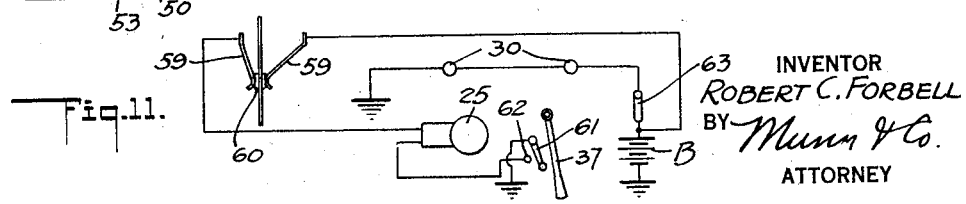

Figures 5 and 6 are sectional views taken on the lines 5—5 and 6—6, respectively, of Figure 4;

Figure 7 is a fragmentary view of the web embodied in the signal unit shown in Figure 4;

Figure 8 s a view showing in horizontal section the actuating device comprised in the direction signal shown in Figure 1;

Figure 9 is a view showing the actuating device in front elevation;

Figure 10 is a view similar to Figure 9, with the cover plate of the casing removed;

Figure 11 is a diagrammatic view of the electrical circuit embodied in the direction signal.

Similar reference characters refer to similar parts in each of the several views.

In Figure 1 I have shown my direction signal applied to a motor vehicle and as comprising two signal units S and S' arranged at the front and rear of the vehicle and controlled simultaneously from an actuating device designated generally at D positioned on the instrument board within convenient reach of the operator of the vehicle. As the construction of the two signal units is identical a description of one will suffice for both.

As shown in Figures 2 and 3, each signal unit comprises a box or casing 15 attached to a cross bar 16 at either end of the vehicle by means of bolts 17 adjustable in a strap 18 secured to the rear side of the housing. The front side of the housing is provided with a window spanned by a transparent panel 19 formed of celluloid or the like and held in spanning relation by means of a frame 20. The location of the window is such that sufficient room is left therebeneath to secure a license plate 21 to the front side of the housing as clearly illustrated in Figure 2. As shown in Figures 5 and 6, the bottom of the housing is open to permit the insertion of a U-shaped frame 22 thereinto so as to close the bottom of the housing. This frame is secured in position by screws 23 and is provided with an extension 24 upon which an electric bell 25 is adapted to be supported.

Mounted in the parallel portions of the frame 22 are rollers 26 and 27 arranged one above the other and to which is attached a web 28. The upper roller 26 is a spring roller which constantly acts to wind the web thereon, while the roller 28 is adapted to be rotated against the winding action of the roller 26 to unwind the web from the roller 26 onto the roller 27. The web is provided with a plurality of signal legends 29 which, as shown in Figure 7, are arranged one above the other so that as the web is unwound from the roller 26 the legends will be successively displayed within the window 19. In the normal position of the web as determined by the roller 26 the legend "Safety first" is displayed, as shown in Figure 2, and through the medium of lamps 30 this legend, as well as the others, is visible at night.

The rollers 27 of the two signal units are adapted to be operated simultaneously to unwind the webs 28 the same distance so that the same legends will be simultaneously displayed. To this end the actuating device D is provided and operatively connected to both of the rollers 27. As shown in Figures 8, 9 and 10 the actuating device comprises a casing 31 secured within a suitable opening of the instrument board 32 of the vehicle by terminal flanges 33. The front side of the casing is closed by a cover plate 34 having terminal flanges 35, it being understood that screws or bolts are adapted to extend through the terminal flanges 33 and 35 for securing the casing and cover in fixed position within the instrument board. Mounted within the casing and fulcrumed at the point indicated at 36 is an operating lever 37 having a handle 38 which projects through a slot 39 in the cover 34. This lever is adapted to be manually moved to or from the two extreme positions shown in Figure 8 (one of which is shown in dot and dash lines) and to various intermediate positions, the lever being automatically latched in any one of the positions to prevent accidental displacement thereof by means of a latch bar 40 secured within the slot 39 as shown in Figure 9, and bent to provide recessed portions 41 in which the handle is adapted to seat and to thereby frictionally retain the lever against movement. The several latched positions of the lever 37 as determined by the recessed portions 41 are designated by legends 42 on the cover plate 34 and it will be noted that these legends correspond to the legends 29 on the webs 28.

The lever 37 is provided with an enlarged portion 43 in which is mounted a pintle 44 carrying pulleys 45 to 48, inclusive. These pulleys are adapted to co-operate with other pulleys 49 and 50 rotatable on pintles 51 and providing means for supporting a pair of cables 52 and 53 for movement and in a manner to shorten or lengthen the cables through an actuation of the operating lever 37. As the mounting and mode of connections of the two cables 52 and 53 with the rollers 27 is identical, a description of one will suffice for both. The cable 52 is connected at one end to the corresponding roller 27 as clearly shown in Figure 4, the roller being spirally grooved as indicated at 54 to facilitate winding of the cable thereon. The cable extends from the roller through a flexible conduit 55 which latter, as shown in dash lines in Figure 1, extends from the corresponding signal unit to the casing 31, it being important to note that the opposite ends of the conduit are fixedly secured to the casing and frame 22 respectively to prevent longitudinal contraction of the conduit in order that the cable extended therethrough will properly function in actuating the roller 27. By reference to Figures 8 and 10, it will be seen that the cable 52 extends from the adjacent end of the conduit 55 to the uppermost pulley 45, around the latter and downwardly to the pulley 49. From the pulley 49 the cable is extended around the pulley 46 and from the latter to a point exteriorly of the casing 31, where it is engaged by a clamp 56 for securing the end of the cable against movement. Adjacent the point at which the cable end is extended from the casing, the cable passes over a roller 57 on a pintle 58. As shown, the clamp 56 is made of two plates, one of which is riveted to the casing, and the other adjustable on a bolt to securely clamp the cable end. By releasing the movable clamping plate, the cable end can be adjusted for the purpose of taking up any slack in the cable and to thereby insure the desired rotation of the roller 27 through an operation of the lever 37.

To attract the attention of others to the direction signal so that the indications will be observed, I provide an alarm or audible signal which is the bell 25. The alarm 25 is provided with a circuit including a battery B, a circuit controller and a switch. The circuit controller comprises two spring contact arms 59 arranged at opposite sides of the web 28 and positioned to engage any one of a plurality of contacts 60 fixed in and extending through the web. The contact arms when in engagement with any one contact 60 are bridged so as to complete the circuit and supply current to the alarm for sounding the latter. The circuit controller may be rendered ineffective to sound the alarm by means of the aforementioned switch, said switch comprising a movable contact arm 61 (Figures 8 and 11) movable to engage a stationary contact 62. The arm 61 extends through the slot 39 of the cover plate 34 and is disposed in the path of movement of the handle 38 to be moved to closed position upon movement of the lever to the "safety first" position as illustrated in dot and dash lines in Figure 8. The switch arm is within easy reach of the operator of the vehicle so that should he desire that the alarm not be sounded through the closing of the circuit controller, he may move the switch arm to open position. It is to be noted that when the web 28 displays "Safety first" the contact arms 59 are not bridged so that the alarm is not sounded. However, when the web is moved to display any of the other signal legends, the contact 60 will operate to bridge the contact arms and thus sound the alarm.

The operation of the direction signal is as follows:

With the operating lever 37 in the position shown in dot and dash lines in Figure 8, the webs 28 of both signal units are positioned to display the legends "Safety first". By moving the operating lever right from this normal position the cables 52 and 53 are shortened through the movement of the pulleys 45, 46, etc. to rotate the rollers 27 in a direction to unwind the webs from the rollers 26 and to thereby display any desired signal legend, depending upon to what position the lever 37 is moved. For example, when the lever is in the position shown in Figures 8 and 9, with the handle reposing in the "stop" recess, the rollers 27 have been actuated to unwind the webs a distance sufficient to display "Stop" legends within the windows of the housings. The unwinding of the webs is against the winding action of the spring rollers 26, but the webs can be retained in the unwound positions by the handle 38 engaging the latch bar. When the handle 38 is released the spring rollers will operate to rewind the webs thereon and thus restore them to their original positions in which the legends "Safety first" are displayed.

The lamps 30 as shown in Figure 11 are included in a branch circuit embodying the battery B, and a switch 63, which latter when closed permits the constant illumination of the lamps. It will of course be understood that during the day the switch 33 is opened to extinguish the lamps.

Although I have herein shown and described only one form of direction signal embodying my invention, it is to be understood that various changes and modifications may be made therein without departing from the spirit of the invention, and within the spirit and scope of the appended claim.

I claim:

A direction signal comprising a casing having an open bottom and an opening in its front wall, a transparent panel spanning the opening, a U shaped frame insertable into the casing through its open bottom and closing the latter, means for securing the frame to the casing, a pair of rollers journaled in the end walls of the casing and horizontally disposed above and below the opening, a web having a plurality of signal legends thereon and trained about the rollers to expose a portion of the web at a time through said panel, one of said rollers having a spring normally acting to wind the web thereon, and means by which the other roller is adapted to be rotated to unwind a predetermined length of web from the spring roller and thereby expose any one of the signal legends through said panel.

ROBERT C. FORBELL.